United States Patent [19]

Götz et al.

[11] 4,152,021
[45] May 1, 1979

[54] SPACE FOR AGGREGATES WHICH ARE ARRANGED IN THE ENGINE SPACE OF A MOTOR VEHICLE

[75] Inventors: Hans Götz, Böblingen; Manfred Mordau, Sindelfingen; Gerhard Burk, Magstadt, all of Fed. Rep. of Germany

[73] Assignee: Daimler-Benz Aktiengesellschaft, Fed. Rep. of Germany

[21] Appl. No.: 831,519

[22] Filed: Sep. 8, 1977

[30] Foreign Application Priority Data

Sep. 15, 1976 [DE] Fed. Rep. of Germany ....... 2641444

[51] Int. Cl.$^2$ .............................................. B60R 11/00
[52] U.S. Cl. ................................... 296/37.1; 180/68.5
[58] Field of Search ............................ 180/68.5, 54 A; 296/37.1, 37 R, 28 F, 28 G, 28 R; 98/2, 2.06, 2.07; 224/42.42 R

[56] References Cited

U.S. PATENT DOCUMENTS

| 2,104,765 | 1/1938 | Saunders | 180/68.5 |
|---|---|---|---|
| 2,104,767 | 1/1938 | Saunders | 180/68.5 |
| 2,104,771 | 1/1938 | Saunders | 180/68.5 |
| 2,106,883 | 2/1938 | Black | 180/68.5 |
| 4,065,170 | 12/1977 | Fabian et al. | 180/68.5 X |

*Primary Examiner*—Joseph F. Peters, Jr.
*Assistant Examiner*—Gene A. Church
*Attorney, Agent, or Firm*—Craig & Antonelli

[57] ABSTRACT

An aggregate space for the battery, wiper motor, relays and similar vehicle aggregates arranged within the area of the engine space of a motor vehicle, which is subdivided from the engine space, properly speaking, by at least one partition wall and is constructed as a space that is closed but readily accessible; the space is also adapted to be vented by inlet and discharge openings which are arranged at special locations to utilize a high pressure drop.

15 Claims, 3 Drawing Figures

SPACE FOR AGGREGATES WHICH ARE ARRANGED IN THE ENGINE SPACE OF A MOTOR VEHICLE

The present invention relates to an aggregate space for the battery, the windshield wiper motor and in similar vehicle aggregates which are arranged within the area of the engine space of a motor vehicle.

Different vehicle aggregates which have to be arranged within the area of the engine space, are heat-sensitive or they produce gas vapors or themselves develop heat which has to be kept away from the passenger space.

It is the aim of the present invention to protect the vehicle aggregates against the engine space heat and to keep away from the vehicle passenger space disadvantageous or noxious materials or heat which these aggregates produce.

The underlying problems are solved according to the present invention in that the aggregate space is partitioned off from the engine space, properly speaking, by at least one partition wall and is constructed into a closed, but readily accessible space which is adapted to be vented by inlet and discharge openings which are arranged at special places for the utilization of a high pressure drop. According to a further feature of the present invention, the aggregate space may be arranged in front of the end wall or dashboard of the motor vehicle and may include inlet openings which are provided within the center area of the wide gap between engine hood rear edge and windshield pane. Additionally, discharge openings may be provided within the rear area of the engine hood—longitudinal gaps which are surrounded by walls forming a channel which in turn is provided with inlets or apertures in communication with the aggregate space.

An automatically effective ventilation of the aggregate space dependent on the dynamic pressure is achieved during the drive of the vehicle by such an arrangement under utilization of the pressure drop with a high positive pressure in the center area of the wide gap between the engine hood rear edge and the windshield and with a negative pressure in the rear area of the engine hood longitudinal gaps. Additionally, provision may be made that air flowing in through the inlet openings at first reaches a pressure or air scoop space which is connected by way of openings and by way of an ante-space with the aggregate space. Since a guided air stream is more effective than a non-guided air stream, the engine hood reinforcement together with the engine hood planks may form an air guide channel which is provided with inlet and discharge openings at suitable places in order to bring about such an advantageous air stream.

The discharge openings out of the pressure or air scoop space may be provided with check valve flaps in proximity of fresh air inlets for the passenger space, which with a fully turned-on vehicle passenger-space ventilation blower, prevent the sucking-in of aggregate space air. This sucking-in of false air out of the aggregate space is customarily prevented during normal ventilation, i.e., when the forced ventilation is not turned on, by the labyrinth resistance of the lines, openings and deflections. Additionally, the air conducted in the individual spaces, especially the flow introduced into the air guide channel prevents the formation of moisture corners and therewith a corrosion underneath the engine hood.

Accordingly, it is an object of the present invention to provide a space for aggregates arranged in the engine space of a motor vehicle which avoids by simple means the aforementioned shortcomings and drawbacks encountered in the prior art.

Another object of the present invention resides in a motor vehicle arrangement which protects vehicle aggregates against the engine space heat and at the same time keeps harmful materials or the heat produced by these aggregates from the vehicle passenger space by extremely effective and simple means.

A further object of the present invention resides in an aggregate space for a motor vehicle in which, with an automatic passenger space ventilation that is simple, the vehicle passenger space is protected effectively against fouling during its ventilation by air from the aggregate space.

Still another object of the present invention resides in a space for aggregates arranged in the engine space of a motor vehicle which reduces the likelihood of corrosion under the engine hood due to the formation of moisture in corners.

These and further objects, features and advantages of the present invention will become more apparent from the following description when taken in connection with the accompanying drawing which shows, for purposes of illustration only, two embodiments in accordance with the present invention, and wherein.

Figure 1:
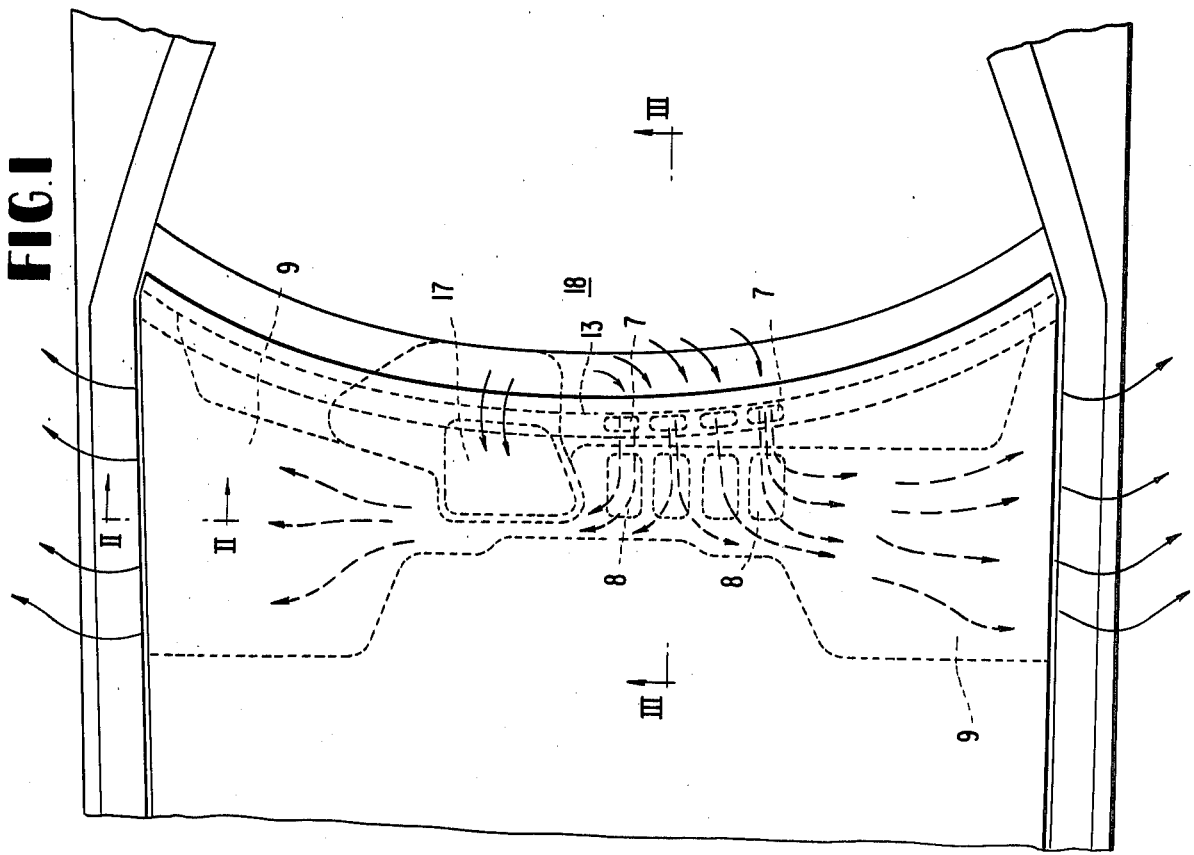
FIG. 1 is a somewhat schematic plan view on the rear portion of the engine hood with openings and aggregate spaces in accordance with the present invention.
Figure 3:
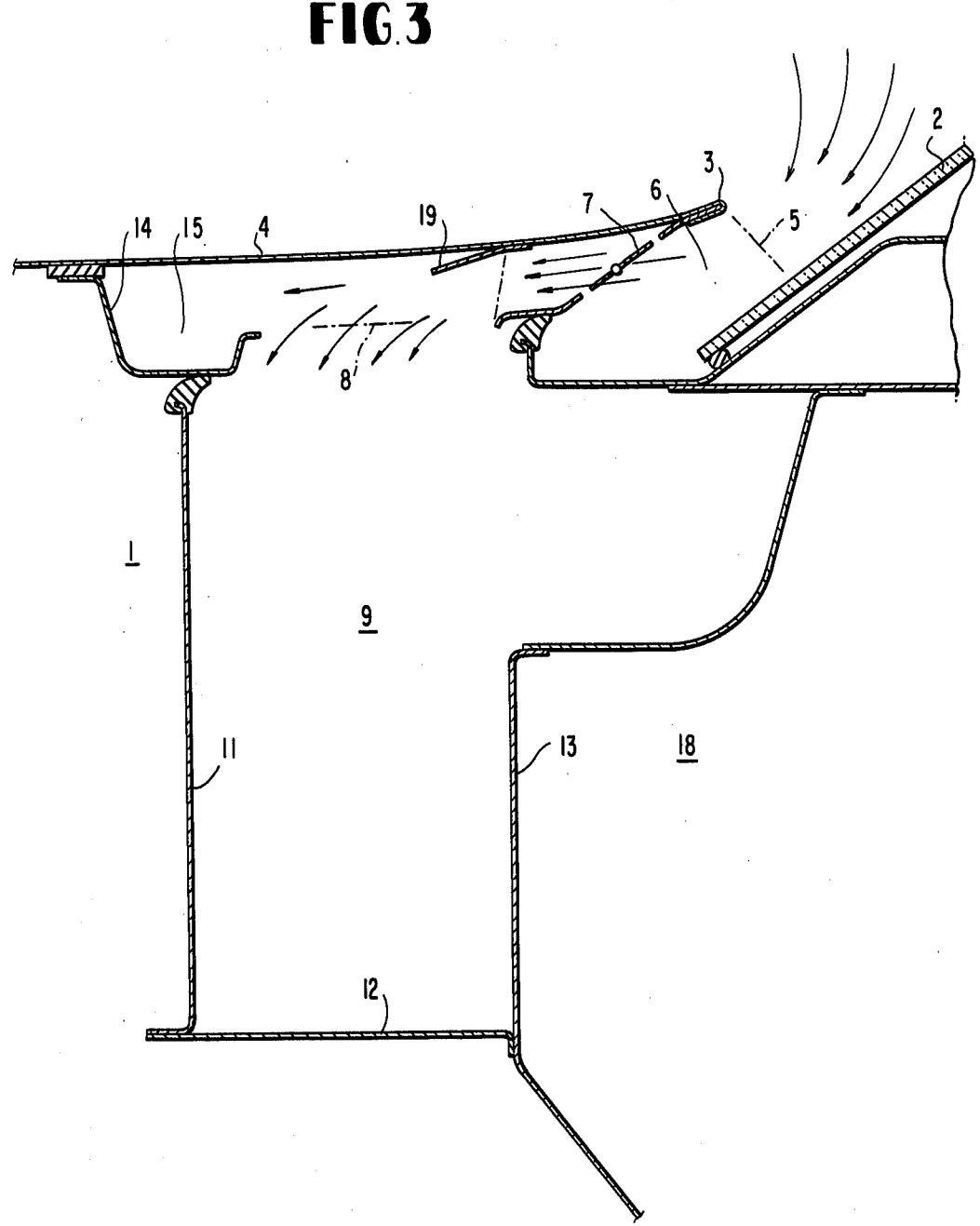
FIG. 3 is a cross-sectional view taken along line III—III of FIG. 1.

Referring now to the drawing wherein like reference numerals are used throughout the various views to designate like parts, in the part of a motor vehicle illustrated in the drawing which includes the rear area of an engine space 1 (FIG. 3) and the windshield pane 2, a wide gap 5 is provided between the rear edge 3 of the engine space planks or panels 4 and the windshield pane 2, through which air for the ventilation of the passenger space is introduced. The air which has entered through the gap 5 reaches at first an air scoop or pressure space 6 (FIG. 3). Several openings 7 (FIGS. 1 and 3) are provided in the space 6, through which the air dammed up in the space 6 can leave the same again in order to reach by way of further openings 8 the aggregate spaces 9, which are closed off in the engine space on all sides by walls 11, 12 and 13 on both sides of the vehicle. The upper delimitation of the aggregate spaces 9 is formed by the engine hood planks or panels 4. When lifting the engine hood, the aggregate spaces 9 are readily accessible.

Figure 4:
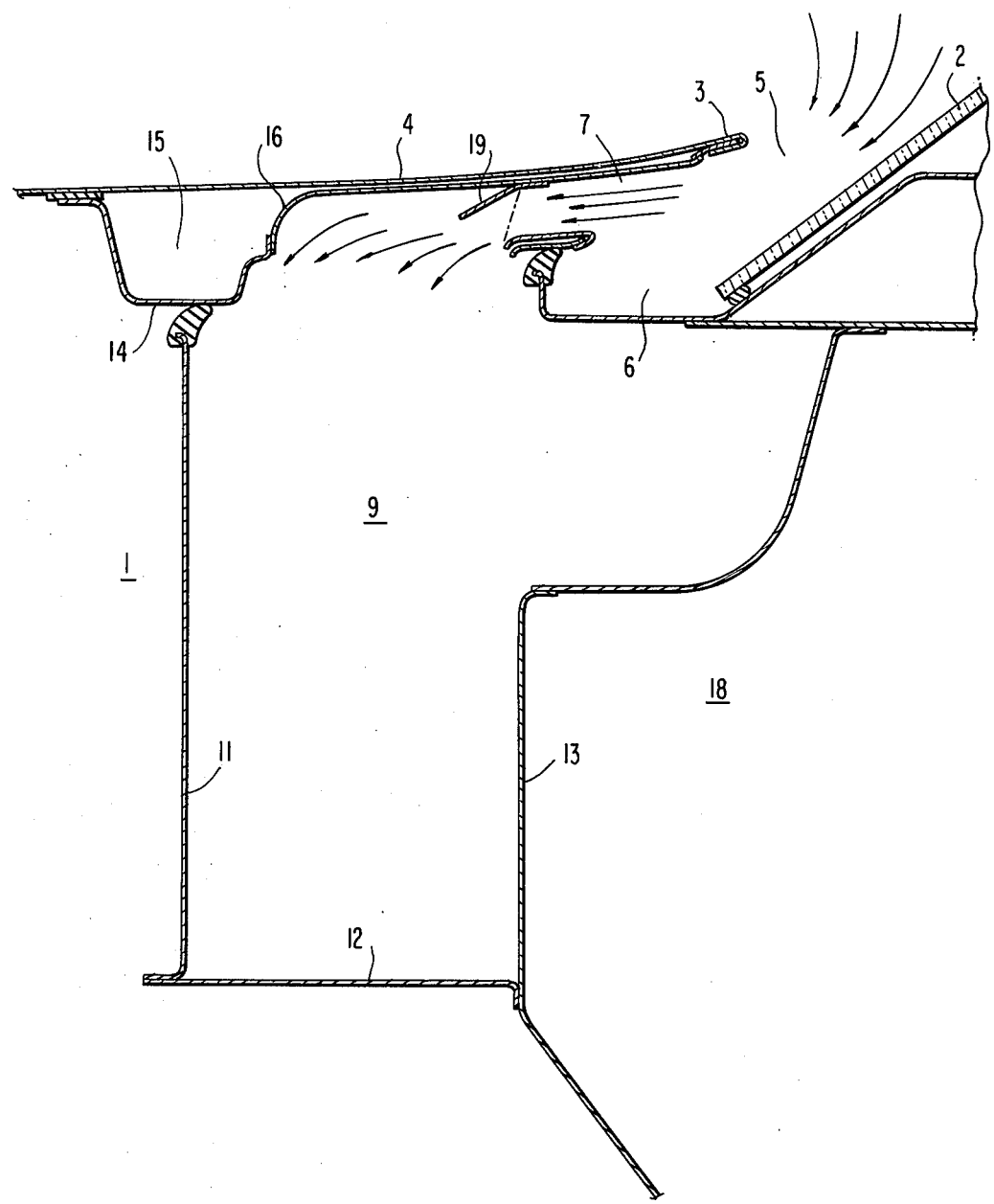
FIG. 4 is a cross-sectional view, similar to FIG. 3, of a modified arrangement with air guide baffles in accordance with the present invention.

The engine hood reinforcement 14 (FIG. 3) forms together with the engine hood planks 4 an air guide channel 15 which receives air by way of the openings 7 and 8 and feeds the air to the two aggregate spaces 9. An air-resistance-reducing connection between the openings 7 and 8 is established by the air guide baffle plate 16 (FIG. 4). Check valve flaps 19 are provided at the inlet openings 7 which are arranged in proximity of the fresh air inlets 17 (FIG. 1) for the vehicle passenger space 18, which with a fully turned-on vehicle passenger space ventilation blower prevent the sucking-in of false air out of the aggregate spaces 9.

Figure 2:
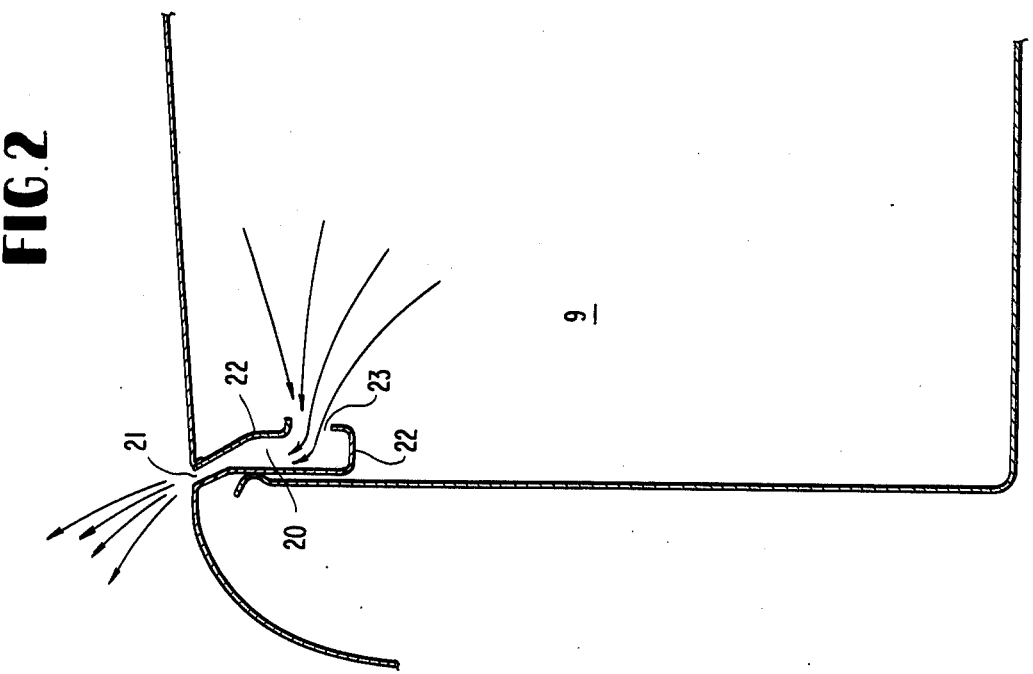
FIG. 2 is a cross-sectional view taken along line II—II of FIG. 1.

The air supplied to the aggregate spaces 9 reaches again the atmosphere through outlet openings 21 (FIG. 2) in the rear area of the engine hood longitudinal gaps, which are surrounded by walls 22 forming a channel 20, which is provided with apertures or inlets 23 in communication with the aggregate space.

The discharge openings 21 are arranged at places of high vacuum whereas the inlet openings 7 are provided where the dynamic air pressure builds up so that air introduced with excess pressure into the aggregate spaces is again sucked off by the vacuum at the discharge openings 21.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An aggregate space for vehicle aggregates which are arranged within the area of the engine space of a motor vehicle, characterized in that the aggregate space is subdivided from the engine space, by at least one partition wall means which extends across substantially the entire width of the engine space and is constructed into a substantially closed, but readily accessible space, said space being operable to be ventilated by inlet and discharge openings which are arranged at predetermined locations for the utilization of a high pressure drop, an upper delimitation of said aggregate space being formed by the engine hood planks or panels of the motor vehicle.

2. An aggregate space according to claim 1, characterized in that the aggregate space is arranged in front of the dashboard of the motor vehicle passenger space and includes inlet openings which are provided within the center area of a wide gap between engine hood rear edge and windshield pane.

3. An aggregate space according to claim 2, characterized in that discharge openings are provided within the rear area of engine hood longitudinal gaps which are surrounded by wall means forming a channel, which is again provided with aperture means in communication with the aggregate space.

4. An aggregate space according to claim 3, characterized in that air flowing through the inlet openings at first reaches into an air-scoop space which is in communication with the aggregate space by way of openings and an ante-space.

5. An aggregate space according to claim 4, characterized in that an air guide channel means is formed by engine hood reinforcement means together with engine hood plank means, said air guide channel means being provided with inlet and discharge openings at appropriate places.

6. An aggregate space according to claim 5, characterized in that the inlet openings out of the air-scoop space are provided with check valve flap means in proximity of fresh air inlets for the vehicle passenger space which automatically prevent the sucking-in of air from the aggregate space with a fully turned-on vehicle passenger space ventilation blower.

7. An aggregate space according to claim 1, characterized in that discharge openings are provided within the rear area of engine hood longitudinal gaps which are surrounded by wall means forming a channel, which is again provided with aperture means in communication with the aggregate space.

8. An aggregate space according to claim 1, characterized in that air flowing through the inlet openings at first reaches into an air-scoop space which is in communication with the aggregate space by way of openings and an ante-space.

9. An aggregate space according to claim 1, characterized in that an air guide channel means is formed by engine hood reinforcement means together with engine hood plank means, said air guide channel means being provided with inlet and discharge openings at appropriate places.

10. An aggregate space according to claim 1, characterized in that the inlet openings out of the air-scoop space are provided with check valve means in proximity of fresh air inlets for the vehicle passenger space which automatically prevent the sucking-in of air from the aggregate space with a fully turned-on vehicle passenger space ventilation blower.

11. An aggregate space for vehicle aggregates which are arranged within the area of the engine space of a motor vehicle, characterized in that the aggregate space is subdivided from the engine space, by at least one partition wall means and is constructed into a substantially closed, but readily accessible space, said space being operable to be ventilated by inlet and discharge openings which are arranged at predetermined locations for the utilization of a high pressure drop, an upper delimitation of said aggregate space being formed by the engine hood planks or panels of the motor vehicle.

12. An aggregate space according to claim 11, characterized in that the aggregate space is arranged in front of the dashboard of the motor vehicle passenger space and includes inlet openings which are provided within the center area of a wide gap between the rear edge of the engine hood and the windshield pane.

13. An aggregate space according to claim 11, characterized in that discharge openings are provided within the rear area of engine hood longitudinal gaps which are surrounded by wall means forming a channel, which is again provided with aperture means in communication with the aggregate space.

14. An aggregate space according to claim 11, characterized in that an air guide channel means is formed by engine hood reinforcement means together with engine hood plank means, said air guide channel means being provided with inlet and discharge openings at appropriate places.

15. An aggregate space according to claim 11, characterized in that the inlet openings out of the air-scoop space are provided with check valve means in proximity of fresh air inlets for the vehicle passenger space which automatically prevent the sucking-in of air from the aggregate space, with a fully turned-on vehicle passenger space ventilation blower.

* * * * *